(12) United States Patent
Shealtiel (10) Patent No.: US 6,836,643 B2
(45) Date of Patent: Dec. 28, 2004

(54) MODULE SPECIFIC INTERFACE FOR CELLULAR PHONES

(76) Inventor: Moshe Shealtiel, Oshrat, doar na Oshrat 25243 (IL)

( * ) Notice: Subject to any disclaimer, the term of this patent is extended or adjusted under 35 U.S.C. 154(b) by 498 days.

(21) Appl. No.: 09/775,500

(22) Filed: Feb. 5, 2001

(65) Prior Publication Data

US 2002/0106993 A1 Aug. 8, 2002

(51) Int. Cl.$^7$ ............................................. H04Q 7/32
(52) U.S. Cl. ............... 455/74.1; 455/90; 455/575; 379/428.01; 379/428.02; 379/428.04
(58) Field of Search .................. 455/74, 74.1, 344, 455/346, 347, 90, 575, 550, 462, 463, 425, 426, 517; 379/428.01, 428.02, 428.04, 429, 435, 446, 455

(56) References Cited

U.S. PATENT DOCUMENTS

| | | | | |
|---|---|---|---|---|
| 4,752,949 A | * | 6/1988 | Steinbeck et al. | 455/74 |
| 5,010,565 A | * | 4/1991 | Nash et al. | 455/74 |
| 5,131,020 A | | 7/1992 | Liebesny et al. | 455/74 |
| 5,133,081 A | | 7/1992 | Mayo | 455/74 |
| 5,309,502 A | * | 5/1994 | Hirai | 455/462 |
| 5,461,546 A | | 10/1995 | Kobayashi et al. | 455/74 |
| 5,490,285 A | | 2/1996 | Ahlenius et al. | 455/74 |
| 5,544,227 A | * | 8/1996 | Blust et al. | 455/426 |
| 5,633,920 A | * | 5/1997 | Kikinis et al. | 455/462 |
| 5,642,303 A | | 6/1997 | Small et al. | 455/74 |
| 5,680,441 A | * | 10/1997 | Gallo | 455/462 |
| 5,715,296 A | | 2/1998 | Schornack et al. | 455/74 |
| 5,758,293 A | | 5/1998 | Frasier | 455/74 |
| 5,812,950 A | | 9/1998 | Tom | 455/74 |
| 5,822,324 A | | 10/1998 | Kostresti et al. | 455/74 |
| 5,841,971 A | | 11/1998 | Longginou et al. | 455/74 |
| 5,850,610 A | | 12/1998 | Testani et al. | 455/74 |
| 5,890,069 A | * | 3/1999 | Evans et al. | 455/462 |
| 5,930,719 A | * | 7/1999 | Babitch et al. | 455/462 |
| 6,163,703 A | * | 12/2000 | Lee | 455/462 |
| 6,295,460 B1 | * | 9/2001 | Nagel et al. | 455/557 |

* cited by examiner

*Primary Examiner*—William Trost
*Assistant Examiner*—Keith Ferguson
(74) *Attorney, Agent, or Firm*—Mark M. Friedman (57) ABSTRACT

A system for connecting between at least one radio communication transceiver and at least one conventional telephone including: (a) at least one detachable adaptor, each adaptor having (i) a cellular transceiver docking connector, the connector operatively connected to the radio communication transceiver, and (ii) an interface module operatively connected to the docking connector, wherein the module is designed and configured for utilization of at least one protocol that enables information transfer between the conventional telephone and the transceiver.

31 Claims, 8 Drawing Sheets

MODULE SPECIFIC INTERFACE FOR CELLULAR PHONES

FIELD AND BACKGROUND OF THE INVENTION

The present invention relates to auxiliary equipment for radio communication transceivers, and, more particularly, to an inventive universal adaptor and an inventive docking station for connecting various types of cellular telephones with a conventional telephone or telephone line, and to a telephone system utilizing such an adaptor to provide communication and auxiliary telephone services between cellular telephones and conventional telephones or telephone lines.

There is growing concern about the safety of hand-held cellular telephones, because they emit microwave radiation near the user's brain. Near the antenna, power densities as high as 300 W/m$^2$ are common. Studies have shown that long term exposure to radiation power densities as low as 5 W/m$^2$ can produce mutations in cell cultures.

Figure 1:
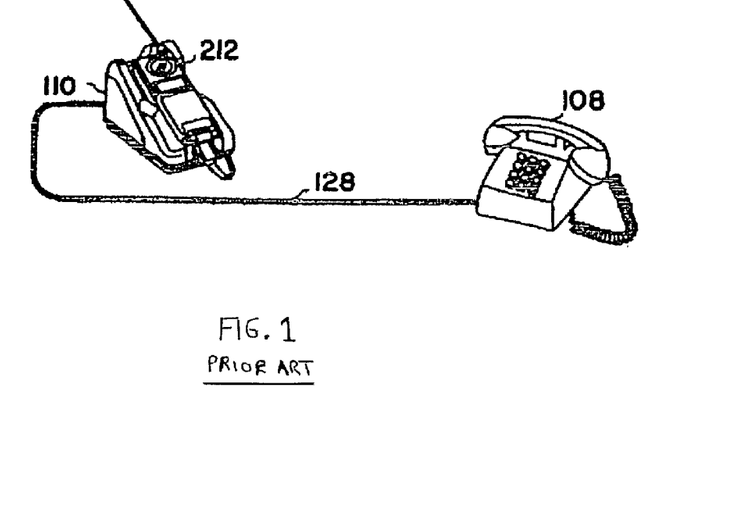
FIG. 1 is a pictorial diagram of a prior-art cellular interface connected to a standard telephonic type communication device.

One efficient method of reducing radiation while at the same time, making the use of cellular phones more convenient, is to connect a cellular phone to a plain old telephone (POT) or the like by means of a cellular phone docking station, such that incoming cellular calls can be received on the POT, and outgoing cellular calls can be conducted from the POT. A prior art device featuring a combination charging circuit and docking station 110 for hand-held cellular transceivers is shown in FIG. 1. Device 110 enables the coupling of hand-held cellular transceiver 212 with a standard telephone-type communication device 108, such as a facsimile, modem, plain old telephone or any other device that would normally be coupled to a standard telephone wall jack.

One deficiency of currently-known docking stations is that they are generally appropriate for a cellular transceiver of a particular manufacturer (and often, for a specific model). The mechanical connections, voltage, protocols, etc. tend to vary from model to model and from manufacturer to manufacturer, particularly in view of the constant improvements in the performance and capability that are designed into cellular transceivers.

Consequently, a docking station that is purchased today may be inappropriate for the model of tomorrow, or for the cellular transceiver of a guest or colleague. It would be advantageous to have a system in which a docking station would be suitable for use in conjunction with any present-day, commercially-available cellular transceiver, or with any cellular transceiver that becomes commercially-available in the future.

Moreover, when conventional telephone lines and/or service are down, unreliable, or slow, the functioning of companies, hospitals, police stations and various kinds of organizations may be crippled. Sophisticated internal telephone networks are essentially of no use with regard to communication with the outside world. It would be of great advantage to have a system that enables incoming calls to various cellular transceivers to be connected and routed through such internal telephone lines or networks to the appropriate destination, even when the conventional telephone service is impaired or not functioning. It would also be of great advantage to have a system enabling outgoing calls to be routed from a telephone unit connected to the internal telephone network to an external telephone or telephone line. This would allow even large internal networks to communicate with external phones in a substantially normal fashion, despite local problems with the conventional telephone company service.

SUMMARY OF THE INVENTION

According to the present invention there is provided a system for connecting between at least one radio communication transceiver and at least one conventional telephone including: (a) at least one detachable adaptor, each adaptor having (i) a cellular transceiver docking connector, the connector operatively connected to the radio communication transceiver, and (ii) an interface module operatively connected to the docking connector, wherein the module is designed and configured for utilization of at least one protocol that enables information transfer between the conventional telephone and the transceiver.

According to another aspect of the present invention there is provided a method for routing a call to and from at least one radio communication transceiver, the method including: (a) providing a system including: (i) at least one radio communication transceiver; (ii) a detachable adaptor for each transceiver, each adaptor having: (A) a cellular transceiver docking connector, the connector operatively connected to the radio communication transceiver, and (B) an interface module operatively connected to the docking connector, the module designed and configured for utilization of at least one protocol that enables information transfer between the conventional telephone and the transceiver; (iii) a transceiver docking station for each transceiver; (iv) a system controller unit for controlling operation of the system, and (v) a plurality of conventional telephones, each of the telephones operatively connected to the system controller unit, such that each transceiver is operatively connected to at least one docking station and at least one adaptor; (b) connecting each radio communication transceiver, via the adaptor, to the transceiver docking station for each receiver, and (c) routing a call between the radio communication transceiver and at least one of the conventional telephones by means of the system controller unit.

According to further features in the described preferred embodiments, the call is an incoming call from the transceiver to at least one of the conventional telephones.

According to further features in the described preferred embodiments, the call is an outgoing call from one of the conventional telephones to one of the transceivers.

According to still further features in the described preferred embodiments, the system further includes a conventional telephone switchboard, one or more calls being normally routed by the switchboard, and the routing is performed solely according to a pre-determined condition.

According to still further features in the described preferred embodiments, the pre-determined condition is selected from at least one of the group consisting of disabled telephone company service, partially disabled telephone company service, overloaded telephone company service, and a manual override of a telephone company service.

According to still further features in the described preferred embodiments, the radio communication transceiver is a cellular transceiver.

According to still further features in the described preferred embodiments, the system further includes: (b) a transceiver docking station, operatively connected to the adaptor.

According to still further features in the described preferred embodiments, the detachable adaptor further includes: (iii) a docking station connector for connecting between the adaptor and the docking station.

According to still further features in the described preferred embodiments, the docking station includes: (i) a mechanical interface operatively connecting to the docking station connector, and (ii) a controller, operatively connected to the interface, for identification of the transceiver and for operation of at least one protocol.

According to still further features in the described preferred embodiments, the docking station includes: (i) a mechanical interface operatively connecting to the docking station connector, and (ii) a controller, operatively connected to the interface, for identification of the transceiver and for selection and operation of at least one protocol based on the identification.

According to still further features in the described preferred embodiments, the docking station is a modular docking station.

According to still further features in the described preferred embodiments, the controller is further designed and configured to determine and implement a voltage based on the identification.

According to still further features in the described preferred embodiments, the system further includes a plurality of modular transceiver docking stations, each of the modular docking stations operatively connected to one of each adaptor.

According to still further features in the described preferred embodiments, each adaptor further includes: (iii) a docking station connector for connecting between each pair of adaptor and docking station.

According to still further features in the described preferred embodiments, each of the modular docking stations includes: (i) a mechanical interface operatively connecting to the docking station connector, and (ii) a controller, operatively connected to the interface, for identification of the transceiver and for operation of at least one protocol.

According to still further features in the described preferred embodiments, each of the modular docking stations includes: (i) a mechanical interface operatively connecting to the docking station connector, and (ii) a controller, operatively connected to the interface, for identification of the transceiver and for selection and operation of at least one protocol based on the identification.

According to still further features in the described preferred embodiments, at least two of the modular docking stations are connected in series.

According to still further features in the described preferred embodiments, the modular docking stations are operatively connected to a system control unit.

According to still further features in the described preferred embodiments, each of the modular docking stations is equipped with a first connector for receiving an external power supply and an external communication, and with a second connector for transmitting power from the external power supply and transmitting the external communication to at least one other modular docking station.

According to still further features in the described preferred embodiments, each of the modular docking stations includes has a bypass switch, such that upon activation of the switch, the power from the external power supply and the external communication are bypassed to a subsequently-disposed station of the modular docking stations.

According to still further features in the described preferred embodiments, the first connector and second connector of the modular docking stations connected in series are complementary connectors.

According to still further features in the described preferred embodiments, the complementary connectors are connected to form a male-female connection.

According to still further features in the described preferred embodiments, the system further includes: (c) a telephone unit operatively connected to the docking station.

According to still further features in the described preferred embodiments, the telephone unit includes: (d) a computer connection and/or (e) a fax connection and/or (f) a connection to an internal phone system.

According to still further features in the described preferred embodiments, the system includes a plurality of pairs, each of the pairs including a detachable adaptor and a docking station.

According to still further features in the described preferred embodiments, each of the pairs has an operative communication connection to a system controller unit.

According to still further features in the described preferred embodiments, each operative communication connection is in a parallel configuration.

According to still further features in the described preferred embodiments, each operative communication connection is in a series configuration.

According to still further features in the described preferred embodiments, the system further includes (c) a telephone unit including: (i) at least one conventional telephone receiver.

According to still further features in the described preferred embodiments, the telephone unit further includes: (ii) a keyboard for making telephone calls, and (iii) a display operatively connected to the keyboard.

According to still further features in the described preferred embodiments, the telephone unit further includes: (iv) a receptacle for a cordless telephone receiver, the receiver being operatively connected to the conventional telephone receiver.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention is a system for connecting between a radio communication transceiver of substantially any variety and a conventional telephone line, using an inventive detachable adaptor that interfaces between the radio communication transceiver and a transceiver docking station.

The principles and operation of the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

As used herein the specification and in the claims sections that follows, the term "conventional telephone" refers to a plain old telephone (POT), a wireless POT, an internal telephone line or system, and the like.

As used herein in the specification and in the claims section that follows, the term "radio communication transceiver" refers to an electronic device capable of sending and receiving radio signals. Cellular telephones fall within the definition of radio communication transceiver.

As used herein in the specification and in the claims section that follows, the term "cellular telephone" and the like refer to a communications device capable of communicating with a cellular communications network, as this term is further defined hereinbelow.

As used herein in the specification and in the claims section that follows, the term "cellular communications network" refers to a communications network which employs, at least in part, radio signals for communication of information and has communication cells. It will be appreciated that the cellular communications network can be of any type having, for example, digital capability, employing, e.g., TDMA (Time Division Multiple Access) or CDMA (Code Division Multiple Access) technology. An example of a network that is appropriate for use with the present invention is UMTS (universal mobile telecommunication system) which is a GSM-based third generation mobile network. UMTS, scheduled to be introduced in 2001 will build on and extend the capabilities of present day mobile technologies (like digital cellular and cordless) by providing increased capacity, data capability and a far greater range of services using an innovative radio access scheme and an enhanced, evolving core network allowing users to access remote systems through a band-width of up to 144 Kbps. Further detail relating to cellular communications networks can be found in a plurality of text books, an example of which is Cellular Telephones and Pages, An Overview, Stephen W. Gibson, 1997, Butterworth-Heinemann, USA, and in, for example, U.S. Pat. Nos. 5,812,950; 5,758,293; 5,490,285; 5,822,324; 5,131,020; 5,133,081; 5,481,546; 5,642,303; 5,850,610 and 5,841,971, which are incorporated by reference as if fully set forth herein.

Figure 2:
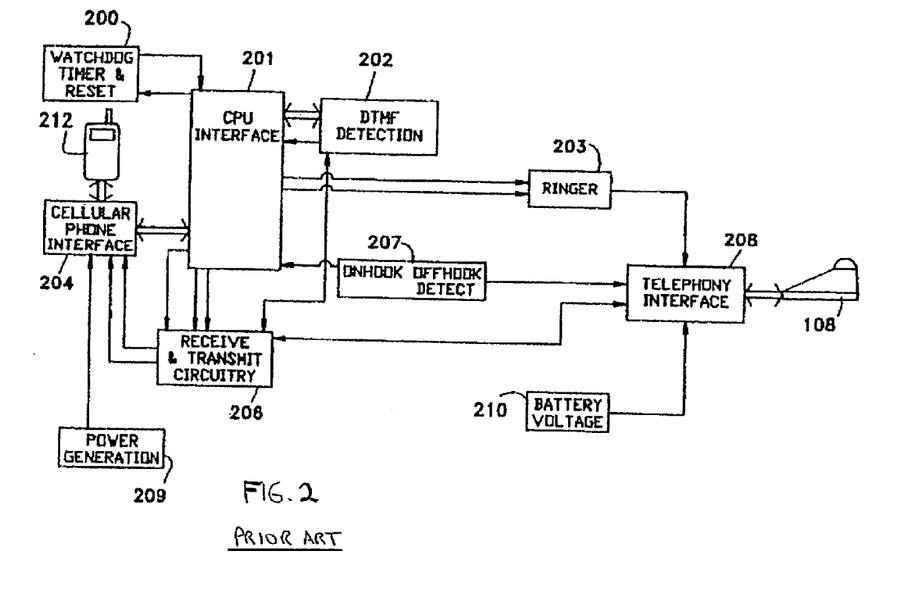
FIG. 2 is a block diagram of a prior-art cellular interface.

The system shown in FIG. 2 is a conventional, prior-art interface for interfacing a cellular telephone 212 to a telephonic device 108, allowing the telephonic device 108 to access communications via the cellular telephone 212. The present invention can utilize this prior-art system, and, therefore, a description thereof would be beneficial for a complete understanding of the system of the invention. The prior-art system of FIG. 2 is described in U.S. Pat. No. 5,715,296 to Schornack, et al., which is incorporated by reference for all purposes as if fully set forth herein, connects a standard telephone device 108 to the cellular telephone 212 via a cellular telephone interface 204. The cellular telephone interface 204 is the actual physical connection that interfaces the cellular telephone 212 to the telephone device 108, via the telephone company line interface 208. All the necessary information and power to the cellular telephone is received and/or supplied through the cellular telephone interface 204. Once power is applied, communication is established between the cellular telephone 212 and the CPU interface 201. It uses a microprocessor, preferably an Intel 8051 type, to perform all its operations, such as initializing the cellular telephone 212, setting all of the control signals (I/Os) to their initial states for a ringer circuit 203, and a receive and transmit circuit 206. The software is written in 8051 assembly language. All functions of the unit are controlled by CPU interface 201. The CPU interface 201 communicates with the cellular telephone 212 via cellular interface 204 and controls the necessary hardware on board. This initializing is started by the Watchdog Timer & Reset circuit 200, which is the circuit that jump-starts the operation of all the intelligence embedded into the system, and it will restart the operation of all the intelligence if it detects an improper state of the external hardware and/or internal timing sequences. During initialization, the CPU interface 201 sets all the necessary I/Os of the microprocessor to their default conditions required by the external hardware to function properly. The telephone interface 208 is preferably an FCC part 68 compatible RJ-11. At this point, if the telephonic device 108 connected to the telephone interface 208 were to be taken offhook, a precision standard dial tone would be received by the telephonic device 108.

One deficiency of the above-described and other currently-known docking stations is that they are generally appropriate for a cellular transceiver of a particular manufacturer (and often, for a specific model). The mechanical connections, voltage, protocols, etc. tend to vary from model to model and from manufacturer to manufacturer, particularly in view of the constant improvements in the performance and capability that are designed into cellular transceivers. For example, the four pins that are used to communicate data to and from a cellular transceiver may be identical, in terms of size and location, to the four pins of a different type of cellular transceiver. However, because the kind of information transferred through one or more pins varies from one transceiver to another, a given docking station that is dedicated for one type of cellular transceiver is generally unsuitable for another type. Moreover, even if a current docking station design would be made to handle two or more types of cellular transceivers, such a docking station would be generally unsuitable for other types of transceivers—existing or future—that require different protocols, mechanical connections, etc.

Figure 3:
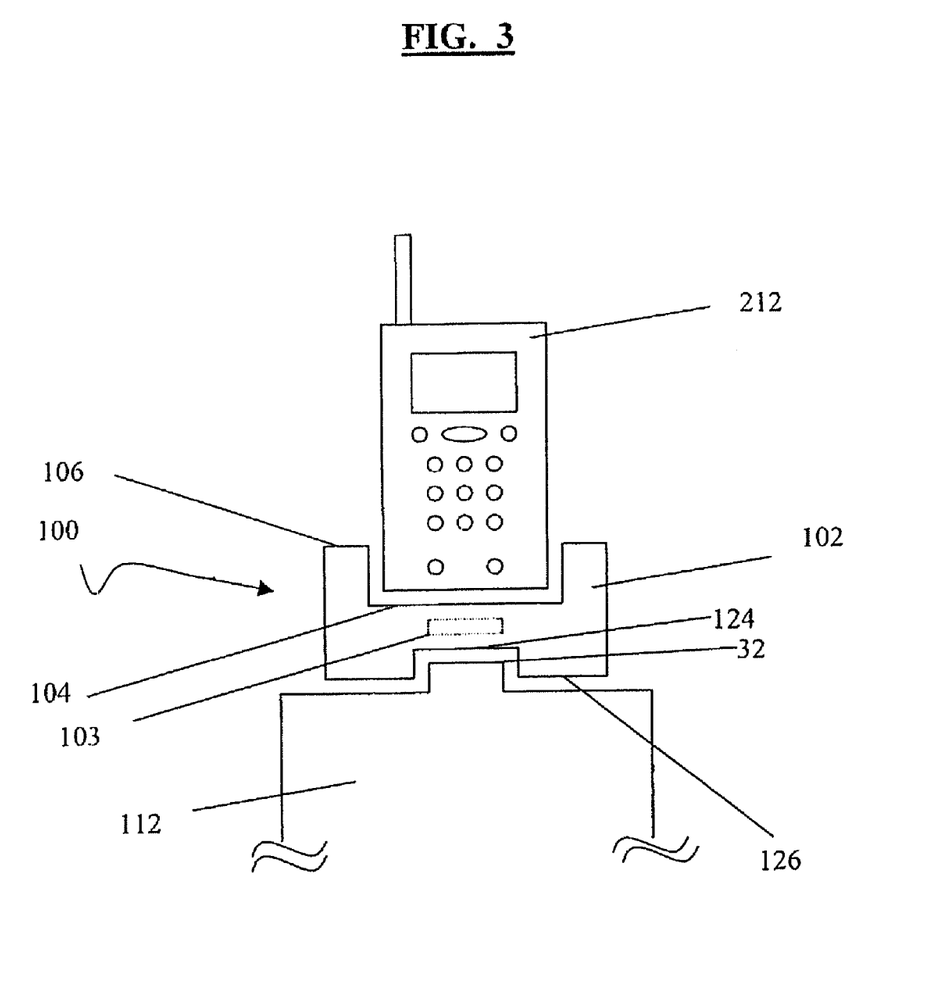
FIG. 3 is a schematic illustration of a universal adaptor of the present invention, adapting between a transceiver and a transceiver docking station.

A universal adaptor of the present invention, for adapting between a transceiver 212 and a transceiver docking station 112, is provided in FIG. 3. Universal adaptor 100 has an adaptor housing 102 having a transceiver receptacle 104 on a top surface 106, for receiving transceiver 212, and a docking station receptacle 124 on a bottom surface 126, for receiving transceiver docking station 112.

Within universal adaptor 100 is disposed an interface module 103, which includes a PCB, preferably a multi-layer PCB, equipped with standard components (chips and/or dips, etc.). Interface module 103, via transceiver receptacle 104, identifies the transceiver presence and type and communicates the appropriate protocol between transceiver 212 and transceiver docking station 112.

Transceiver docking station 112 is not identical to currently-known docking stations such as docking station 110 (FIG. 1). A basic block diagram of novel transceiver docking station 112, for use in conjunction with the above-described universal adaptor, is provided in FIG. 4.

Figure 4:
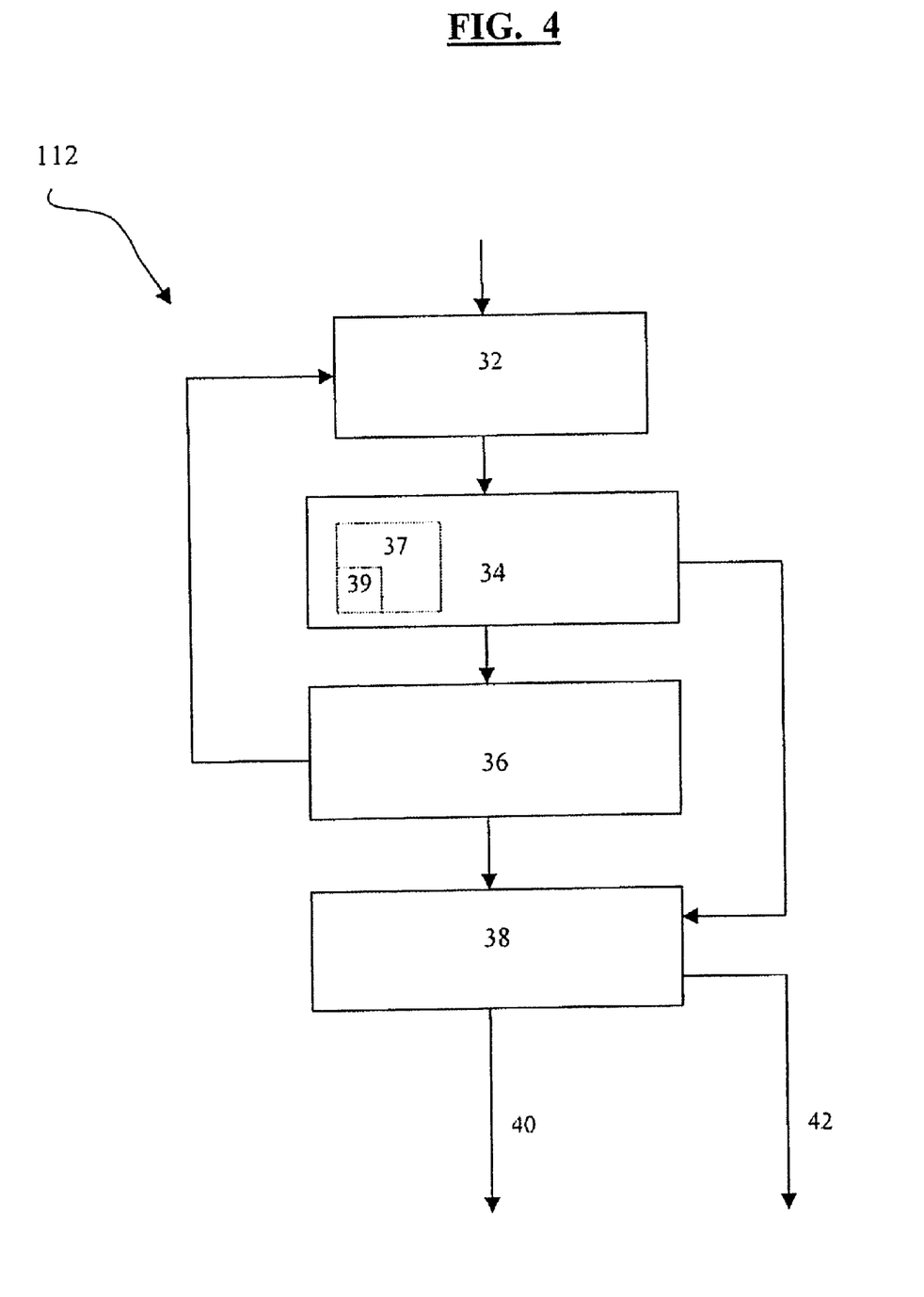
FIG. 4 is a basic block diagram of a novel transceiver docking station, for use in conjunction with the above-described universal adaptor.

Although the various components of transceiver docking station 112 can be powered directly from a conventional, external power supply, it is preferable to have an internal power supply modulator 36 that provides a more steady current output to these components. These components preferably include a mechanical module-specific interface 32 externally connecting with docking station receptacle 124 (shown in FIG. 3) of the universal adaptor, and through which, inter alia, is effected the charging of transceiver 212; main controller 34, which, as in conventional controllers, controls communications, runs protocols, etc.; and phone line module 38, which is operatively connected to main controller 34, and which provides an interface with a phone jack 40 and optionally, with one or more phone lines 42. Mechanical module-specific interface 32 is operatively connected to main controller 34. It must be emphasized that mechanical module-specific interface 32 is an interface that is designed and configured to connect with docking station receptacle 124 of universal adaptor 100.

Main controller 34 includes a PCB assembly 37, preferably a multi-layer PCB, equipped with standard components. Preferably, PCB assembly 37 is identical in design to the PCB assembly in interface module 103 disposed within universal adaptor 100 (see FIG. 3). PCB assembly 37 includes a read and write chip 39. Via read and write chip 39, PCB assembly 37 reads data and/or commands obtained from, and writes data and/or commands to, the PCB assembly in communication unit 103. In this way, it is possible for the two PCB assemblies to have identical data contents.

Because transceiver docking station 112 does not have the size constraints of universal adaptor 100, PCB assembly 37 can be spread out so as to allow communications access to substantially any point in PCB assembly 37. This is of particular advantage in systems having multiple docking stations, as will be discussed below.

Because a variety of transceivers can be used in conjunction with transceiver docking station 112 by means of the universal adaptor, main controller 34 must identify the identity of the transceiver inserted into the adaptor, and upon identification/verification, implement the appropriate protocol, voltage, etc., according to predetermined instructions.

Figure 5:
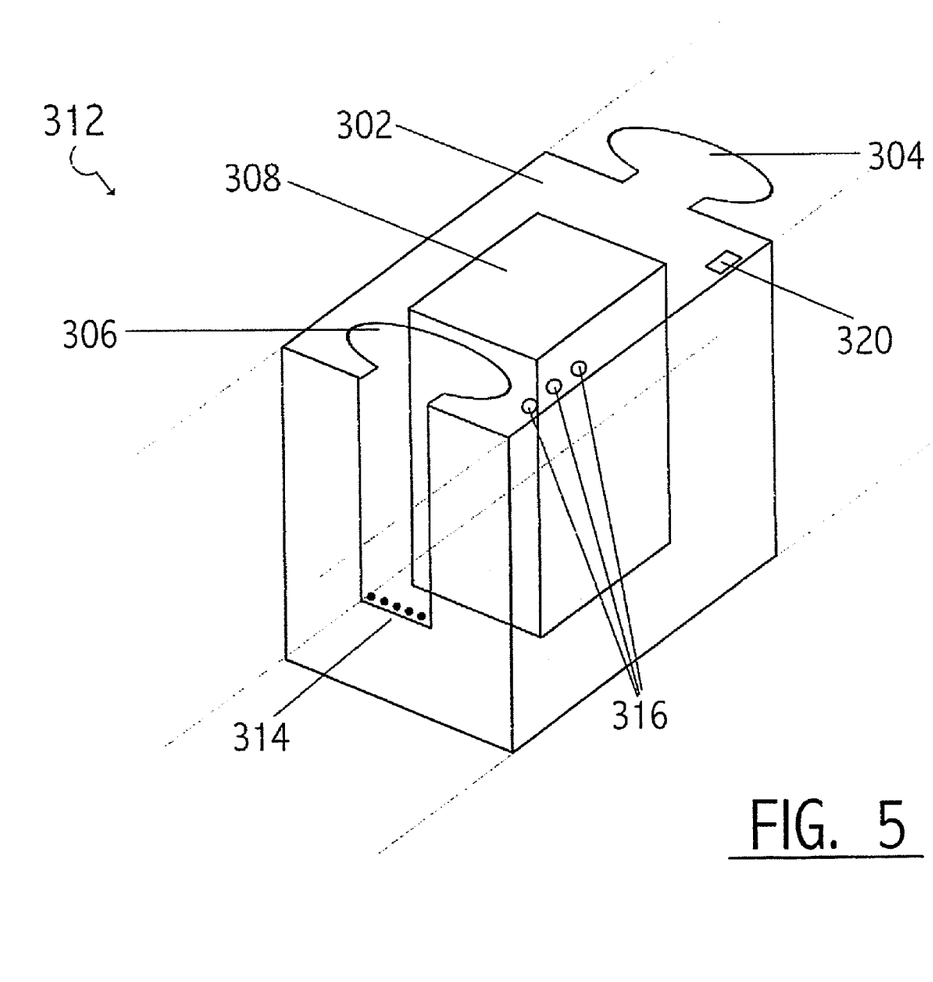
FIG. 5 provides a schematic illustration of a modular docking station of the present invention.
Figure 6:
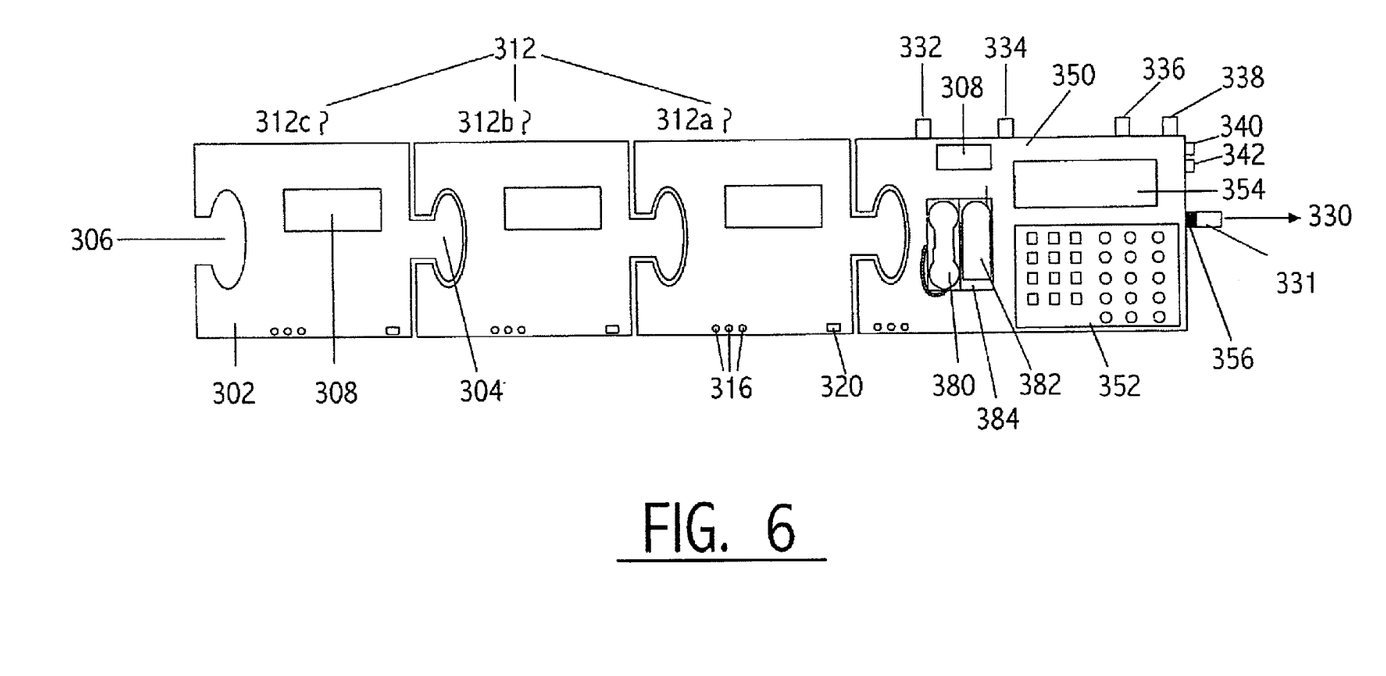
FIG. 6 provides a schematic illustration of modular docking stations connected in series to a controller.

FIG. 5 provides a schematic illustration of a modular docking station 312 of the present invention. FIG. 6 provides a schematic illustration of a series of three modular docking stations 312a–c connected in series to a system controller unit 350. Referring now to FIG. 5, modular docking station 312 is generally cuboidal, containing a receptacle 308 on top face 302 for receiving universal adaptor 100 and transceiver 212 (both shown in FIG. 3). On opposite sides of modular docking station 312 are disposed male connector 304 and female connector 306. Female connector 306 is preferably a receptacle having a circular, oval, or elliptic cross-section. However, other cross-sections, including square and rectangular, are also possible. At the bottom of female connector 306 is disposed one or more contacts 314 that provide power and communication connections from female connector 306 of modular docking station 312 to a male connector of a succeeding modular docking station, shown in FIG. 6.

Referring now to FIG. 6, male connector 304 can be connected to a female connector 306 of another modular docking station or to a female connector of system controller 350. System controller unit 350 controls the function of modular docking stations 312a–312c. Female connector 306, in turn, can be hooked up to a male connector of another modular docking station. Thus, a series of modular docking stations can be connected to a single controller using the above-described structure.

System controller unit 350 is equipped with a keyboard 352 (optionally including keys for programming, call-transferring, and special function keys) and a display 354. Optionally and preferably, system controller unit 350 also includes receptacle 308 for receiving universal adaptor 100 and transceiver 212 (both shown in FIG. 3).

Optionally and preferably, some of the functions of system controller unit 350 are substantially similar to system controller units in conventional telephony units, in which calls are routed to various internal lines, answering service is provided, etc. The system of the present invention allows an entire switchboard to function by coupling a plurality of cellular phones to POTs. Thus, system controller unit 350 is optionally and preferably equipped with conventional telephone receiver (with cord) 380, and/or cordless telephone 382, each of which can be docked in docking receptacle 384. Cordless telephone 382 can also be charged in docking receptacle 384.

System controller unit 350 is equipped with a power supply connection 332, an active internet or additional telephone line connection 334, a computer connection 336, a fax connection 338, and a connection to an internal phone system 340 and/or to an internal switchboard 342.

The unit provided in FIG. 6 is ideal for back-up or parallel use when conventional telephone lines and/or service are down, unreliable, or slow, and as such, are particularly appropriate for use in hospitals and health centers, and in government, police, and military settings. Using the above-described unit, incoming calls to various cellular transceivers can be routed through internal telephone lines or networks to the appropriate destination, even when the conventional telephone service is not functioning. Similarly, outgoing calls can be routed from a telephone unit connected to the internal telephone network to an external telephone or telephone line via system controller unit 350. Thus, even large internal networks can communicate with external phones in a substantially normal fashion, despite local problems with the conventional telephone company service.

The use of system controller unit 350 along with a plurality of docking stations (particularly when arranged in series) is also extremely advantageous in high-pressure settings in which conventional telephone service is unavailable, limited, or inconvenient, for example, exhibitions, outdoor concerts and rallies, etc.

It must also be emphasized that the functions of system controller unit 350 can be divided into two distinct units: a unit controlling modular docking stations 312a–312c, and a unit controlling the switching/routing of calls to an internal phone line or system, fax, etc. In this case, system controller unit 350 includes a connector 356 and connector cable 331 for connecting to connector 330 of telephone unit 400 described in FIG. 9 below. This is discussed in further detail below.

Referring again to FIG. 6, system controller unit 350 sends signals in series to modular docking stations 312a–312c. Each of modular docking stations 312a–312c returns a signal to system controller unit 350, in which is conveyed information such as transceiver presence (yes/no), transceiver identity, etc. Because modular docking stations 312a–312c do not have the size constraints of universal adaptor 100, PCB assembly 37 can be spread out so as to allow communications access to substantially any point in PCB assembly 37.

Modular docking station 312 preferably includes a bypass switch 320 that allows modular docking station 312 to be bypassed, such that power and communication connections from the female connector of a preceding modular docking station can be transferred directly to a modular docking station succeeding modular docking station 312. This feature is particularly important in the event of a malfunctioning modular docking station, which might otherwise cause all succeeding modular docking stations to be deactivated.

Modular docking station 312 preferably includes indication lights 316, which indicate whether or not station 312 is receiving power, whether station 312 is operational, whether station 312 is currently in use (i.e., a call is in progress), etc.

Figure 7:
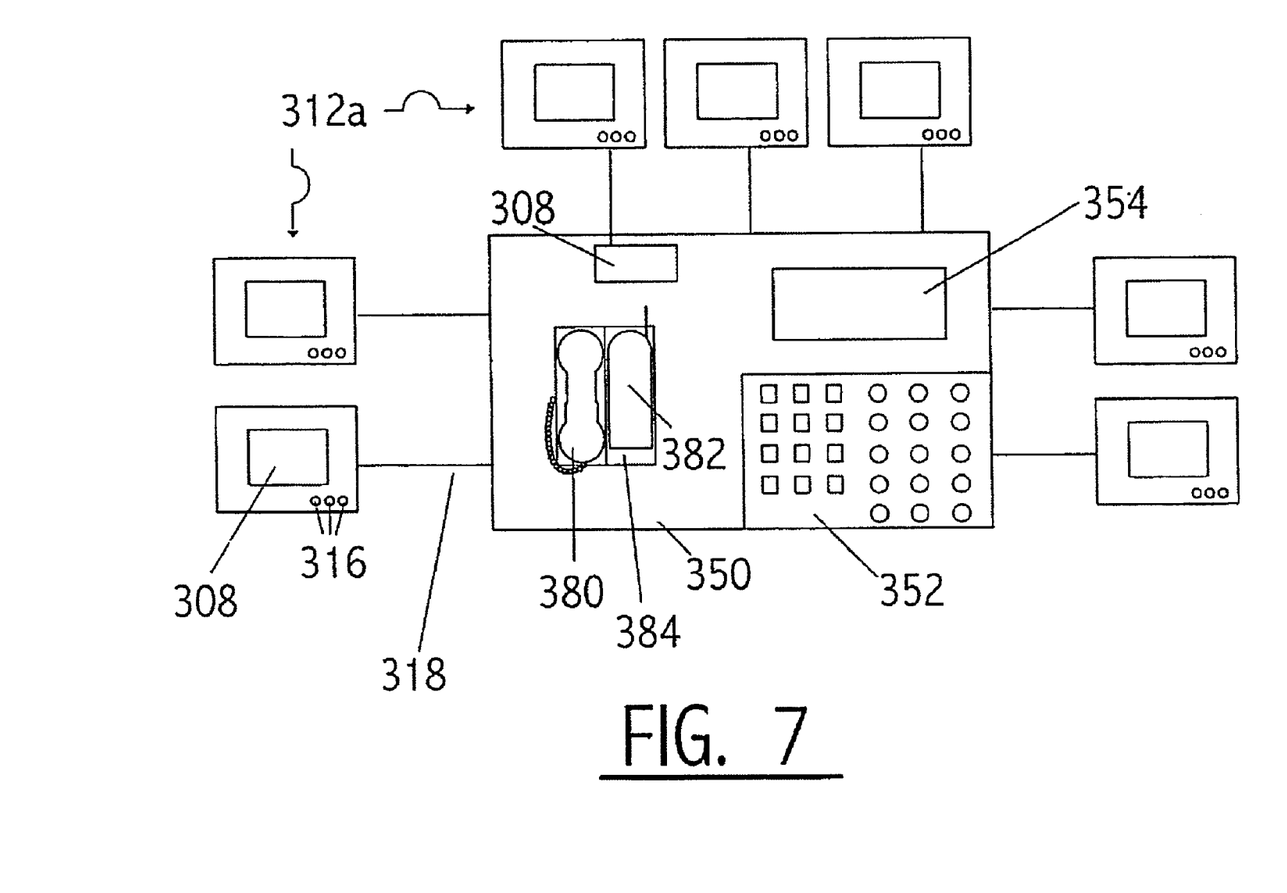
FIG. 7 provides a schematic illustration of an alternative embodiment in which modular docking stations are connected in parallel to a controller.

An alternative system configuration, in which modular docking stations 312a are connected in parallel to system controller unit 350, is provided in FIG. 7. System controller unit 350 is equipped with a keyboard 352 and a display 354. Optionally and preferably, system controller unit 350 also includes receptacle 308 for receiving universal adaptor 100 and transceiver 212 (both shown in FIG. 3). System controller unit 350 functions substantially like system controller units in conventional telephony units, in which calls are routed to various internal lines, answering service is provided, etc. The system of the present invention allows an entire switchboard to function by coupling a plurality of cellular phones to POTs.

Each modular docking station 312a is connected in parallel to system controller unit 350 by means of cable 318. Cable 318 is both a communication cable and a power supply cable. Such cables are somewhat thick and correspondingly expensive. Moreover, a large number of cable surrounding system controller unit 350 is undesirable. Hence, the series configuration illustrated in FIG. 6 is presently preferred over the parallel configuration of FIG. 7.

It should be noted that it is possible to use a parallel configuration (such as that of FIG. 7) without necessitating a plurality of cables. For example, modular docking stations could be directly attached to the system controller unit around the perimeter of the controller unit. This configuration is not practical, however, for large numbers of modular docking stations, and in addition, can make the overall system bulky and unwieldy.

Figure 8:
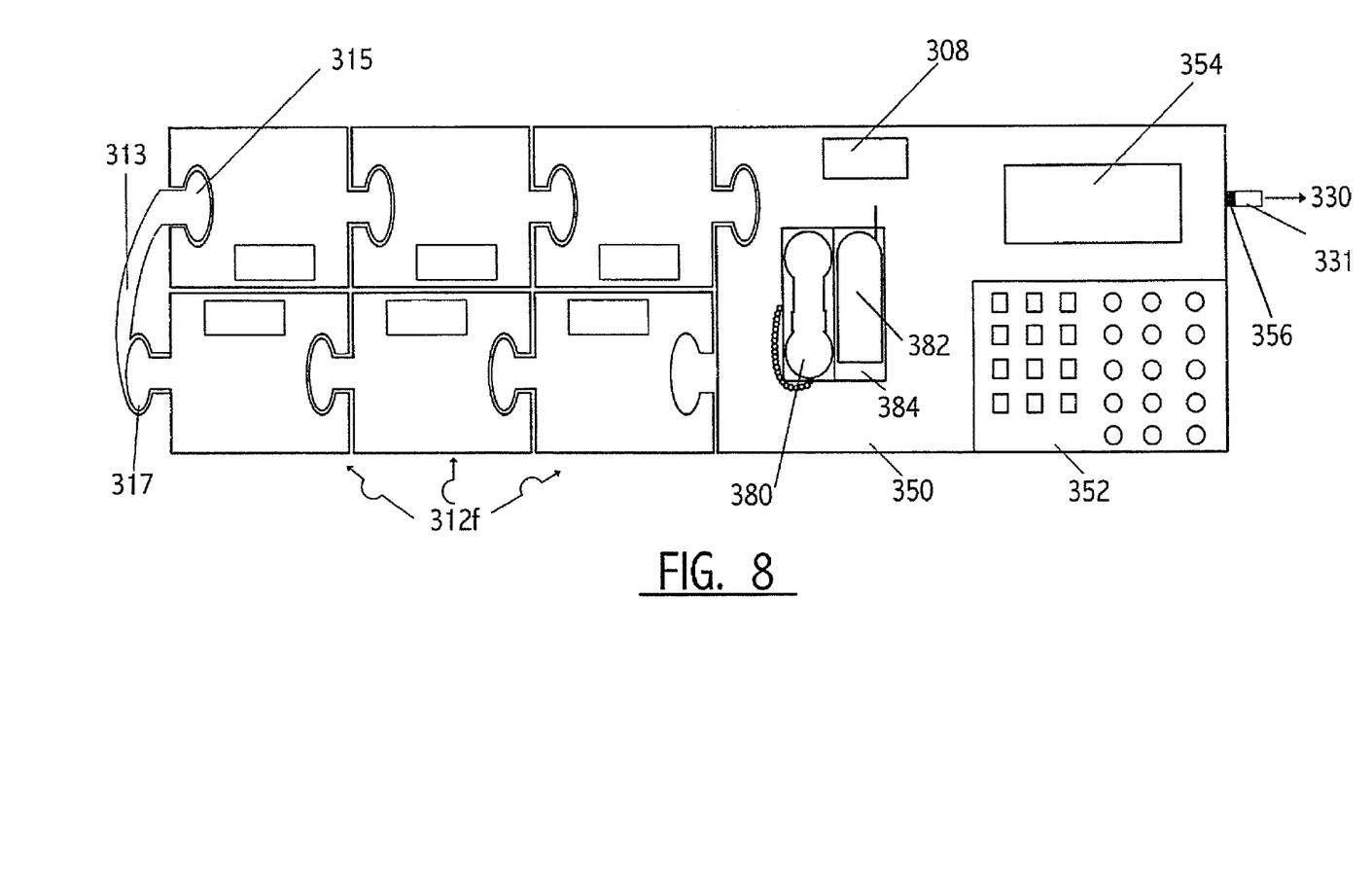
FIG. 8 provides a schematic illustration of two rows of modular docking stations connected in series to a controller, the rows being connected via a flexible adaptor.

Another configuration, provided in FIG. 8, has six modular docking stations 312b disposed in series, by way of example, with the width of each modular docking station 312f being about ½ the width of system controller unit 350. But, in contrast to the configuration provided in FIG. 6, modular docking stations 312f are disposed in two rows, with flexible adaptor 313 connecting between the two rows. Flexible adaptor 313 is equipped with a male fitting 315 on one end and a female fitting 317 end, fittings 315, 317 being substantially identical to the male and female fittings of each modular docking station 312f. System controller unit 350 optionally includes all of the features described in FIG. 6. System controller unit 350 optionally includes a connector 356 and connector cable 331 for connecting to connector 330 of telephone unit 400 described in FIG. 9 below.

Figure 9:
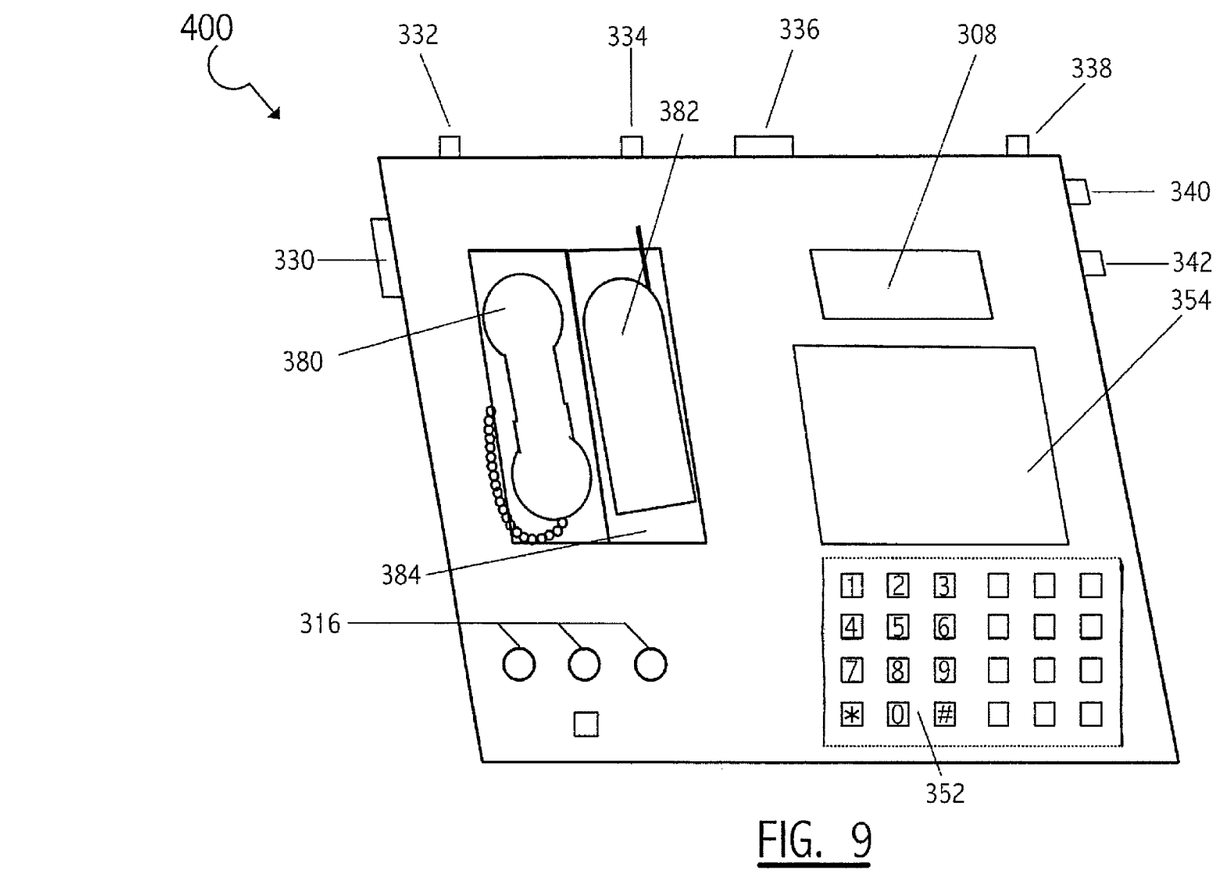
FIG. 9 provides a schematic illustration of an inventive telephone unit having a receptacle for receiving the universal adaptor of the present invention.

Based on the above-described inventive features and further features described below, an inventive telephone unit is disclosed hereunder. Referring now to FIG. 9, telephone unit 400 includes a keyboard 352 (including keys for programming, call-transferring, and special function keys) and a large display 354. Telephone unit 400 also includes a receptacle 308 for receiving universal adaptor 100 and transceiver 212 (both shown in FIG. 3).

Telephone unit 400 is equipped with a power supply connection 332, a connection 330 to above-described controller 350, an active internet or additional telephone line connection 334, a computer connection 336, a fax connection 338, and a connection to an internal phone system 340 and/or to an internal switchboard 342. When connected to telephone unit 400, controller 350 controls the function of the various docking stations, but does not need to be equipped with conventional telephone receiver 380, cordless telephone 382, docking receptacle 384, the dialing buttons of keyboard 352, etc.

While the invention has been described with respect to a limited number of embodiments, it will be appreciated that many variations, modifications and other applications of the invention may be made.

What is claimed is:

1. A system for routing a call between at least one radio communication transceiver and at least one of a plurality of conventional telephones, the system comprising:
    (a) at least one detachable adaptor, each said adaptor operative for connecting to the at least one radio communication transceiver, each said adaptor having:
        (i) a transceiver docking connector, said connector operative for connecting to the radio communication transceiver, and
        (ii) an interface module operatively connected to said docking connector, said module designed and configured for enabling information transfer between the at least one of a plurality of conventional telephones and the at least one transceiver;
    (b) a transceiver docking station for the at least one transceiver;
    (c) a system controller unit, operatively connected to said plurality of conventional telephones, for controlling operation of the system so as to route the call between the at least one radio communication transceiver and at least one of said plurality of conventional telephones, via said adaptor and said docking station.

2. The system of claim 1, wherein said docking station includes a chip for communicating with said interface module.

3. The system of claim 2, wherein said interface module is disposed within said detachable adaptor.

4. The system of claim 1, said radio transceiver docking station being a plurality of modular radio transceiver docking stations, wherein at least two of said modular docking stations are connected in series.

5. The system of claim 1, wherein the radio communication transceiver is a cellular transceiver.

6. The system of claim 1, wherein said detachable adaptor includes a pocket for receiving the radio communication transceiver.

7. A method for routing a call to and from a radio communication transceiver, the method comprising the steps of:
   (a) providing a system including:
      (i) a detachable adaptor, said adaptor operative for connecting to the radio communication transceiver, said adaptor having:
         (A) a transceiver docking connector, said connector operative for connecting to the radio communication transceiver, and
         (B) an interface module operatively connected to said docking connector, said module designed and configured for enabling information transfer between at least one of a plurality of conventional telephones and the radio transceiver;
      (ii) a transceiver docking station for the radio transceiver;
      (iii) a system controller unit, operatively connected to said plurality of conventional telephones, for controlling operation of the system so as to route the call between the radio communication transceiver and said plurality of conventional telephones, via said adaptor and said docking station;
   (b) connecting the radio communication transceiver, via said adaptor, to said transceiver docking station, and
   (c) routing a call between the radio communication transceiver and at least one of said conventional telephones by means of said system controller unit.

8. The method of claim 7, wherein said call is an incoming call from the transceiver to at least one of said conventional telephones.

9. The method of claim 7, wherein said call is an outgoing call from one of said conventional telephones to one of the transceivers.

10. The method of claim 7, said system further including a conventional telephone switchboard, wherein said call is normally routed by said switchboard, and wherein said routing is performed solely according to a pre-determined condition.

11. The method of claim 10, wherein said pre-determined condition is selected from at least one of the group consisting of disabled telephone company service, partially disabled telephone company service, overloaded telephone company service, and a manual override of a telephone company service.

12. The method of claim 7, wherein said docking station has a chip for communicating via said interface module.

13. A system for connecting between at least one radio communication transceiver and at least one conventional telephone, the system comprising:
   (a) at least one detachable adaptor, each said adaptor operative for connecting to the at least one radio communication transceiver, each said adaptor having:
      (i) a transceiver docking connector, said connector operative for connecting to the radio communication transceiver, and
      (ii) an interface module operatively connected to said docking connector, and
   (b) a radio transceiver docking station for the at least one transceiver, said docking station having a chip for communicating via said interface module, said docking station operatively connecting to the at least one conventional telephone,
   wherein said interface module is designed and configured for utilization of at least one protocol that enables information transfer between the at least one conventional telephone and the at least one transceiver via said adaptor and said docking station,
   wherein said chip is housed in a first printed circuit board (PCB) assembly, and wherein said interface module includes a second printed circuit board (PCB) assembly.

14. The system of claim 13, wherein said PCB assemblies are configured to communicate with one another.

15. The system of claim 13, said transceiver docking station being a plurality of modular transceiver docking stations, said at least one radio communication transceiver being a plurality of radio communication transceivers, wherein each of said docking stations is operatively connected to and paired with one of said plurality of radio communication transceivers.

16. The system of claim 15, wherein each of said modular docking stations is equipped with at least a first connector for receiving an external power supply and an external communication, sand with at least a second connector for transmitting power from said external power supply and transmitting said external communication to at least one other modular docking station of said modular docking stations.

17. The system of claim 16, wherein at least two of said modular docking stations are connected in series, and wherein said first connector of said modular docking stations and said second connector of said modular docking stations are complementary connectors.

18. The system of claim 17, wherein said complementary connectors connect to form a male-female connection.

19. The system of claim 16, wherein said first connector and said second connector are monolithic to said modular docking station.

20. The system of claim 13, said radio transceiver docking station being a plurality of modular radio transceiver docking stations, wherein at least two of said modular docking stations are connected in series.

21. The system of claim 13, wherein said PCB assemblies are configured to communicate with one another so as to share data.

22. The system of claim 13, wherein the radio communication transceiver is a cellular transceiver.

23. A system for connecting between at least one radio communication transceiver and at least one conventional telephone, the system comprising:
   (a) at least one detachable adaptor, each said adaptor operative for connecting to the at least one radio communication transceiver, each said adaptor having:
      (i) a transceiver docking connector, said connector operative for connecting to the radio communication transceiver, and
      (ii) an interface module operatively connected to said docking connector, and
   (b) a radio transceiver docking station for the at least one transceiver, said docking station having a chip for communicating via said interface module, said docking station operatively connecting to the at least one conventional telephone,
   wherein said interface module is designed and configured for utilization of at least one protocol that enables information transfer between the at least one conventional telephone and the at least one transceiver via said adaptor and said docking station, wherein said radio transceiver docking station has a mechanical interface for attaching to said detachable adaptor, and wherein said at least one radio communication transceiver is a plurality of radio communication transceivers of different types, said at least one detachable adaptor is a plurality of detachable adaptors of different types, said adaptors for connecting to, and communicating with, said radio communication transceivers, and wherein said mechanical interface is designed and configured to attach to any of said adaptors.

24. The system of claim 23, wherein the radio communication transceiver is a cellular transceiver.

25. The system of claim 23, wherein said chip is a read and write chip.

26. The system of claim 23, wherein said interface module is disposed within said detachable adaptor.

27. A system for connecting between at least one radio communication transceiver and at least one conventional telephone, the system comprising:

(a) at least one detachable adaptor, each said adaptor operative for connecting to the at least one radio communication transceiver, each said adaptor having:
 (i) a transceiver docking connector, said connector operative for connecting to the radio communication transceiver, and
 (ii) an interface module operatively connected to said docking connector, and (b) a radio transceiver docking station for the at least one transceiver, said docking station having a chip for communicating via said interface module, said docking station operatively connecting to the at least one conventional telephone, wherein said interface module is designed and configured for utilization of at least one protocol that enables information transfer between the at least one conventional telephone and the at least one transceiver via said adaptor and said docking station, wherein each said adaptor further includes:
 (iii) a docking station connector for connecting between said adaptor and said docking station, and wherein each of said docking stations includes:
 (i) a mechanical interface operatively connecting to said docking station connector, and
 (ii) a controller, operatively connected to said mechanical interface, for identification of said radio transceiver and for selection and operation of said at least one protocol, based on said identification, from a plurality of protocols for radio transceivers of different types.

28. The system of claim 27, wherein said detachable adaptor includes a pocket for receiving the radio communication transceiver.

29. The system of claim 27, wherein the radio communication transceiver is a cellular transceiver.

30. A system for connecting between at least one radio communication transceiver and at least one conventional telephone, the system comprising:

(a) at least one detachable adaptor, each said adaptor operative for connecting to the at least one radio communication transceiver, each said adaptor having:
 (i) a transceiver docking connector, said connector operative for connecting to the radio communication transceiver, and
 (ii) an interface module operatively connected to said docking connector, and (b) a radio transceiver docking station for the at least one transceiver, said docking station having a chip for communicating via said interface module, said docking station operatively connecting to the at least one conventional telephone, wherein said interface module is designed and configured for utilization of at least one protocol that enables information transfer between the at least one conventional telephone and the at least one transceiver via said adaptor and said docking station, said transceiver docking station being a plurality of modular transceiver docking stations, said at least one radio communication transceiver being a plurality of radio communication transceivers, wherein each of said docking stations is operatively connected to and paired with one of said plurality of radio communication transceivers, and wherein each station of said modular docking stations has a bypass switch, such that upon activation of said switch, said power from said external power supply and said external communication are bypassed to a subsequently-disposed station of said modular docking stations.

31. The system of claim 30, wherein the radio communication transceiver is a cellular transceiver.

* * * * *